US012662554B2

(12) United States Patent
Perez Lorenzo et al.

(10) Patent No.: US 12,662,554 B2
(45) Date of Patent: Jun. 23, 2026

(54) MULTISTAGE PROCESS FOR PRODUCING POLYMER DISPERSION OF DISCRETE PARTICLES

(71) Applicants:ORGANIK KIMYA SAN. VE TIC. A.S., Istanbul (TR); ORGANIK KIMYA NETHERLANDS BV, Rotterdam (NL)

(72) Inventors: Guillermo Perez Lorenzo, Istanbul (TR); Fatma Arslan Ülker, Istanbul (TR); Mahir Kaplan, Rotterdam (NL)

(73) Assignees: ORGANIK KIMYA SAN. VE TIC. A.S., Istanbul (TR); ORGANIK KIMYA NETHERLANDS BV, Rotterdam (NL)

( * ) Notice: Subject to any disclaimer, the term of this patent is extended or adjusted under 35 U.S.C. 154(b) by 563 days.

(21) Appl. No.: 18/024,911

(22) PCT Filed: Sep. 7, 2021

(86) PCT No.: PCT/EP2021/074591
§ 371 (c)(1),
(2) Date: Mar. 6, 2023

(87) PCT Pub. No.: WO2022/049304
PCT Pub. Date: Mar. 10, 2022

(65) Prior Publication Data
US 2023/0312766 A1 Oct. 5, 2023

(30) Foreign Application Priority Data
Sep. 7, 2020 (EP) ..................................... 20194943

(51) Int. Cl.
$C08F\ 265/06$ (2006.01)
$C08F\ 2/00$ (2006.01)
(Continued)

(52) U.S. Cl.
CPC ................ *C08F 2/001* (2013.01); *C08F 2/24* (2013.01); *C08F 265/06* (2013.01); *C09D 151/003* (2013.01); *C09J 151/003* (2013.01)

(58) Field of Classification Search
CPC .............................. C08F 2/001; C08F 265/06
See application file for complete search history.

(56) References Cited

U.S. PATENT DOCUMENTS 9,399,694 B2 7/2016 Jakubowski et al.

FOREIGN PATENT DOCUMENTS

EP 3670552 A1 6/2020
WO WO-02066566 A1 * 8/2002 .......... C08F 290/062

OTHER PUBLICATIONS

International Search Report dated Jan. 5, 2022, for corresponding International Patent Application No. PCT/EP2021/074591.
(Continued)

*Primary Examiner* — Catherine S Branch
(74) *Attorney, Agent, or Firm* — Cepeda Patent Law, LLC; Milagros A. Cepeda

(57) ABSTRACT
The present invention relates to a multistage radical emulsion polymerization process for producing a polymer dispersion of discrete particles dispersed in water, thereby producing a novel star shaped polymer composition, where the wet and dry properties of the dispersion polymer obtained by radical emulsion polymerization in water are modified. The present invention also relates to its use in coating, textile and adhesive applications.

11 Claims, 2 Drawing Sheets

(51) Int. Cl.
    *C08F 2/24*         (2006.01)
    *C09D 151/00*     (2006.01)
    *C09J 151/00*     (2006.01)

(56)                  References Cited

OTHER PUBLICATIONS

Written Opinion of the International Preliminary Examining Authority dated Jan. 5, 2022, for corresponding International Patent Application No. PCT/EP2021/074591.
International Preliminary Report on Patentability dated Apr. 5, 2022, for corresponding International Patent Application No. PCT/EP2021/074591.
Demand, Chapter II, dated Feb. 17, 2022.
Andrzej Sienkiewicz, et al; "Swelling effects in cross-linked polymers by thermogravimetry"; J Therm Anal Calorim, vol. 130, Feb. 22, 2017.
What is swelling explain measurement of swelling? Online: Sep. 25, 2023.
Billmeyer Jr., Textbook of Polymer Chemistry (1975) p. 439.

* cited by examiner

MULTISTAGE PROCESS FOR PRODUCING POLYMER DISPERSION OF DISCRETE PARTICLES

FIELD OF THE INVENTION

This application is a National Stage Application under 35 U.S.C. § 371 of PCT International Application No. PCT/EP2021/074591, filed Sep. 7, 2021, which takes priority from European Application Number 20194943.5, filed Sep. 7, 2020, all of which are herein incorporated by reference in their entireties.

The present invention relates to a multistage radical emulsion polymerization process for producing a polymer dispersion of discrete particles dispersed in water, thereby producing a novel star shaped polymer composition, where the wet and dry properties of the dispersion polymer obtained by radical emulsion polymerization in water are modified. The present invention also relates to its use in coating, textile and adhesive applications.

BACKGROUND OF THE INVENTION

Star shaped polymers have been firstly disclosed in 1940s as star shaped polyamides. Another disclosure was in 1960s with the first study demonstrating a method to create well defined star shaped polymers through living anionic polymerization. The at least three arms of star shaped polymers may be chemically identical or different. In addition, individual arms may be composed of multiple polymers, resulting in star-block polymers or star copolymers. The unique properties of star-shaped polymers come from their chemical structure as well as the length and number of their arms.

Typical star shaped polymers in the state of the art are a class of branched polymers with a structure of at least three linear chains connected to a central core. These are generally used in pharmaceutical industry and typically the linear chains extending from the core are much bigger than the core.

U.S. Pat. No. 9,399,694 B2 discloses a polymer composition comprising one or more star macromolecules formed by an arm-first living controlled radical polymerization and having a core and a plurality of polymeric arms, wherein at least one arm of the plurality of polymeric arms is a hydrophilic arm, and at least one arm of the plurality of arms is a copolymeric arm. The copolymeric arm has different segments in itself in terms of hydrophilicity and the hydrophilic polymeric arm is shorter than the copolymer arm.

It is known in the state of the art to have different polymeric arms in order to impart different properties to said star shaped polymers. However, it has never been disclosed to modify the wet and dry properties of dispersion polymers, by exploiting the ability of dispersed polymer particles' outer layer to swell or dissolve in water under appropriate conditions so that after swelling or dissolving, star shaped particles are formed in the dispersion.

SUMMARY OF THE INVENTION

Thus, the object of the present invention is to use the ability of the dispersed polymer particles' outer layer to swell or dissolve in water under the appropriate conditions of pH, temperature and/or the presence of swelling agents capable of producing that effect on the polymeric outer layer, while the core of the particle remains largely unaffected by that swelling/dissolving process.

Accordingly, the present invention is as defined in the accompanying claims.

DETAILED DESCRIPTION

Figure 1:
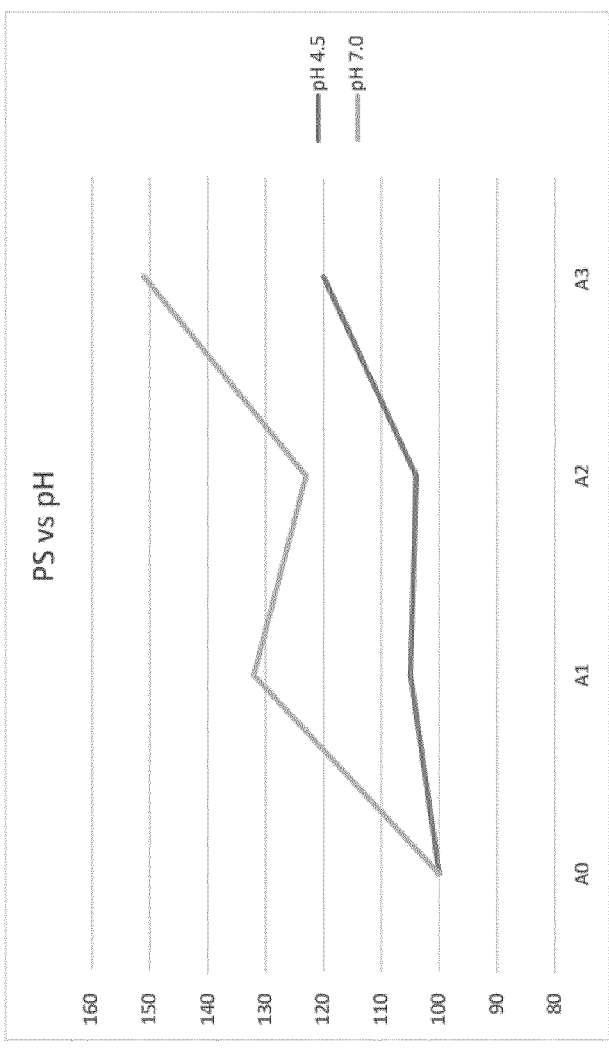
FIG. 1 shows that particle size (PS) of polymer dispersions depends upon the pH.
Figure 2:
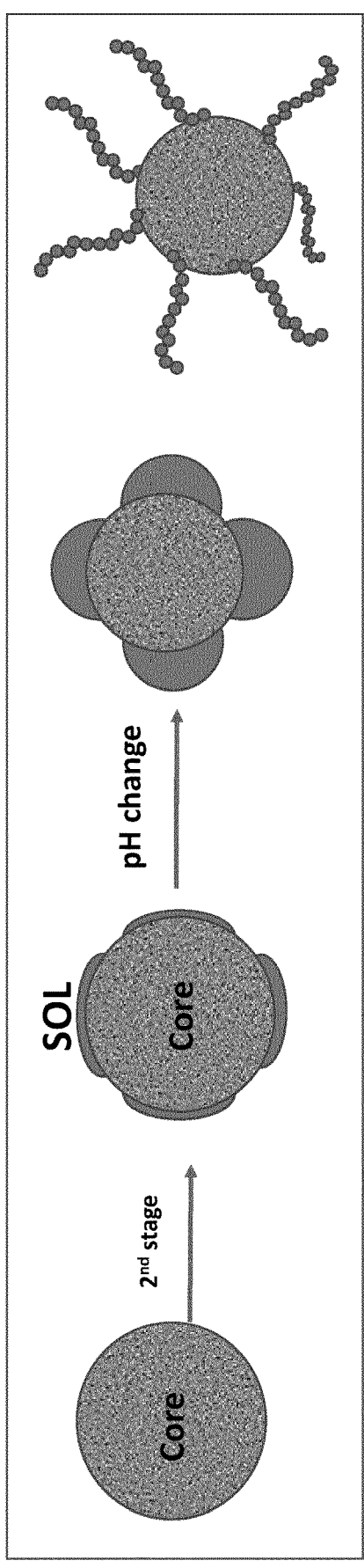
FIG. 2 schematically shows the concept of the present invention.

The dispersed polymer particles obtained by the present invention are spherical and comprise a core and an outer layer. Unlike typical star shaped polymers, they don't have long polymer chains extending from the core. However, the outer layer has the ability to swell under appropriate conditions in order to form a star shape like particle. The swelling of the outer layer does not need to be symmetrical or proportional. The outer layer does not necessarily cover completely the core, so the swelling of the outer layer may lead to a globular pattern. Thus, the swelling does not result with just a bigger particle and forms a shape like a star shaped particle.

The concept of dissolving is clear, well defined in literature and even close to everybody's experience. When a low molecular weight solute such as sugar or salt is added to water, the dissolution process takes place almost immediately. The molecules leave the crystal lattice progressively, disappear into the water, and form a stable, clear solution.

On the other hand, the concept of polymer swelling and dissolving with all its almost infinite intermediate states, amounts up to a much more complex process. Although those concepts are familiar to the person skilled in the art, it has taken a lot of specific work to understand this phenomenon. Polymer molecules, especially those of high molecular weight, behave very differently than sugar or salt. They constitute long chains with a large number of segments, forming tightly folded coils which are even entangled to each other. Numerous cohesive and attractive both intra and intermolecular forces hold these coils together. Based on these features, one may expect noticeable differences in the dissolution behavior shown by polymers. Due to their size, coiled shape and the attraction forces between them, polymer molecules become dissolved quite slowly than low molecular weight molecules. Polymer swelling always precedes dissolution and dissolution only occurs if swelling has taken place, previously. Billmeyer Jr. (1975), for instance, points out that there are two stages involved in this process: in the first place, the polymer undergoes swelling and next the dissolution step itself takes place.

Polymer dissolution behavior differs from dissolution of non-polymeric materials "which dissolve at once". The dissolution of a polymer into a solvent involves two transport processes, namely solvent diffusion and chain disentanglement. When an uncross-linked, amorphous, glassy polymer is in contact with a thermodynamically compatible solvent (solubility parameters will indicate that), the solvent will diffuse into the matrix of the polymer. Due to plasticization of the polymer by the solvent, a gel-like swollen layer is formed along with two separate interfaces and this stage is described as swelling. After time elapses (an induction time), the polymer enters the second stage and dissolves either entirely or partially or only dispersion of the macro molecules forms without actual dissolving.

When a polymer is added to a given solvent, attraction as well as dispersion forces begin acting between its segments, according to their polarity, chemical characteristics and solubility parameter. If the polymer-solvent interactions are higher than the polymer-polymer attraction forces, the chain segment start to absorb solvent molecules, increasing the volume of the polymer matrix (swelling) and loosening out from their coiled shape.

In polymer dissolution, swelling is the first step in the interaction between liquid molecules and polymeric network, which is usually followed by solvation of polymer chains. The immersion of cross-linked polymers in solvents does not lead to their dissolution because of their chemically bonded hydrocarbon chains; nonetheless, these links do not prevent cross-linked polymers from swelling. (Journal of Thermal Analysis and Calorimetry volume 130, pages 85-93 (2017)). A short and sharp definition of swelling is given by Gugliuzza and Drioli (2007): Swelling of a polymeric material is the penetration of a solvent into the polymer network that causes an abrupt volume change.

As a conclusion, to dissolve a polymer is a process that requires swelling, but that swelling does not necessarily leads to a complete dissolution. A long continuum of intermediate states that starts with swelling, may stop there (a significant volume increase) or continue to stages of higher volume, partial solvation, total solvation of the lower molecular weight (MW) fractions present or of the more polar ones, till the complete dissolution.

For the purpose of the present invention, from different stages of swelling up to the different degrees of dissolution, as expressed in the previous paragraph, should be understood as the process undergone by the outer layer of the polymer particle while the main part (core) of that polymeric particle remains substantially unaffected by the swelling process.

Since the chemical nature of the swellable/soluble outer layer (SOL) is different than that of the main polymeric part, the physical and chemical properties of the resulting polymer can be manipulated at two different levels or domains to obtain new features and properties from compositions that, taken in their entirety, do not differ much from the state of the art compositions.

According to the present invention, the main polymeric composition (the composition of the core) has to differ from the one constituting the outer layer, at least, in the ability to swell/dissolve under the conditions the polymeric outer layer does. Naturally, the main polymeric part (the core) can also, eventually, be swollen or dissolved using the right means and conditions but according to the present invention, those means and conditions are not present in any significant way at the moment the swelling/dissolving process of the outer layer takes place.

The outer layer swelling/dissolving conditions can exert some influence on the insoluble main polymeric part which constitutes the core of the particle. For instance, if a radical pH change or high temperatures were needed, the main polymeric part (the core) can for instance moderately expand, be neutralized but without affecting in any significant way its chemical structure, physical state and morphology. It is the outer layer that results dramatically changed under these appropriate conditions. Either it becomes definitely water-soluble or it swells to such an extent that the resulting size and morphology substantially differ from those prior to the application of these conditions. Thus, even if there is any change in the core of the particle due to swelling/dissolving conditions of the outer layer, this change is not significant and is negligible especially when compared with the change in swellable/soluble outer layer.

According to an embodiment of the present invention, under the swelling/dissolving conditions of the outer layer, the change in the core is at least 10 times less than the change that occurs in the swellable/soluble outer layer.

The consequences of the process according to the present invention, as described herein are far reaching. Beyond the particle shape, the wide range of compositional variations for the main polymeric part as the core and the extent of swelling/dissolving the formulator may decide for a particular swellable/soluble outer layer, together make this technology a powerful tool to modify many properties as well as to achieve new combinations of properties.

Methods for preparation of the water insoluble polymer parts as the core as well as the swellable/soluble outer layer (SOL) suitable for the compositions of the present invention are not specifically limited among the state-of-the-art processes. The preferred method is the emulsion polymerization process. The practice of emulsion polymerization is well known and discussed in detail in the literature, for example, in D. C. Blackley, Emulsion Polymerization (Wiley, 1975), and Lovell & El-Aasser (Wiley, 1997). The polymerization temperature is typically from 50° C. to 95° C. and may also involve use of dispersing agents, initiators, accelerators, emulsifiers, chain transfer agents, etc. As will be readily understood by persons of ordinary skill, dispersing agents and emulsifiers include anionic, cationic or non-ionic agents, polymerization initiators may be of the free radical type, such as ammonium, sodium or potassium persulphates as examples of the inorganic type or organic peroxides such as ter-butyl hydroxy peroxide (t-BHP) and benzoyl peroxide or azo derivatives such as ACVA (4,4'-azobis-4-cyanopentanoic acid). The initiators may be used alone or with an accelerator, such as potassium meta-bisulphite, sodium thiosulphate and sulfoxilates (Rongalithe C®), transition metals salts (Fe++, Cu+). Examples of suitable emulsifiers include, for example, alkaline metal and ammonium salts of alkyl, aryl, alkyl-aryl and aralkyl sulphonates, sulphates, polyether sulphates and alkoxylated derivatives of fatty acids, esters, alcohols, amines, amides and alkylphenols. Chain transfer agents, including mercaptans, polymercaptans and polyhalogen compounds may be used in order to control molecular weight.

Suitable water insoluble polymer compositions as the main polymeric part (the core) may contain, as polymerized units, from 0 to 4.5% by weight based on the total monomer composition of the main polymeric part, of one or more monoethylenically unsaturated monomers containing an acidic functional group selected from one or more of carboxylic, sulfonic and phosphonic groups. For example, suitable carboxylic acid monomers include, without limitation, monoethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), beta-dimethylacrylic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof.

Additional suitable monoethylenically unsaturated monomers containing sulfonic acid or phosphonic groups include, for example, 2-acrylamido-2-methyl-1-propane-sulfonic acid, 2-methacrylamido-2-methyl-1-propanesulfonic acid, 3-methacryl-amido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrene-sulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

The swellable/soluble outer layer comprises at least 5% by weight of acid functional monomer selected from the list of monomers as mentioned above or any other acid functional monomer. The rest of the monomers for the main polymeric part (the core) may be any kind of monomers. The rest of the monomers for the swellable/soluble outer layer (SOL) may be any kind of monomers capable of copolymerizing with the acid functional monomer(s) that constitute the 5% or more of the outer layer.

Examples of said monomers to be used in the main polymeric part and the SOL, are typically one or more monoethylenically unsaturated monomers as mentioned below:

The one or more monoethylenically unsaturated monomers may be selected from one or more $(C_1-C_{20})$alkyl (meth)acrylate ester monomers, such as, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth) acrylate), nonadecyl (meth)acrylate, isodecyl (meth)acrylate and combinations thereof. Typically, the $(C_1-C_{20})$alkyl (meth)acrylate esters are $(C_1-C_5)$alkyl (meth)acrylate esters and preferably $(C_1-C_5)$alkyl acrylate esters; more preferably, the $(C_1-C_{20})$alkyl (meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

The one or more monoethylenically unsaturated monomers used to prepare the water insoluble polymer binders as the main polymeric part (the core) and the soluble/swellable outer layer (SOL), may comprise one or more vinylaromatic monomers, such as, for example, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether.

It is also possible for the water insoluble polymer compositions as the main polymeric part (the core) to comprise, as polymerized units, 0.1 to 50%, preferably 0.1 to 25% by weight based on the total amount of monomers of the core of one or more other copolymerizable monomers. Suitable other copolymerizable monomers include, for example, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, amides of ethylenically unsaturated $(C_3-C_6)$carboxylic acids that are substituted at the nitrogen by one or two $(C_1-C_4)$ alkyl groups such as, acrylamide, methacrylamide and N-methylol (meth)acryl-amide.

Additionally, the polymer compositions of main polymeric part and the SOL may comprise from 0.1 to 20% by weight of one or more monoethylenically unsaturated monomers. For example, one or more (meth)acrylic monomers containing one or more pendant reactive functional groups selected from hydroxy, thiol and amino groups. Suitable hydroxy-functional (meth)acrylic monomers include, for example, hydroxyl$(C_1-C_4)$alkyl(meth)acrylates, such as hydroxyethyl methacrylate, hydroxyethyl acrylate, hydroxypropyl methacrylate and hydroxypropyl acrylate. Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethyl-aminopropyl methacrylate and dimethylaminopropyl acrylate. Suitable thiol-functional (meth)acrylic monomers include, for example, 2-mercaptopropyl methacrylate.

The main polymeric part (the core) may have any composition known in the art. Basically, all kind of monomer combinations suitable for free radical polymerization or free radical emulsion polymerization are possible. And it does not need to be homogeneous. Actually, all degrees of heterogeneity are allowed, any kind of functionality is possible, it can be single or multi-staged, core-shell, pre-crosslinked or not, cross-linkable or not, hard or soft, mono- or poly-modal. The requirement according to the present invention is that whatever polymer it is, it does not dissolve, neither significantly swells, under the conditions the swellable/soluble outer layer (SOL) does.

The swellable/soluble outer layer (SOL) is a composition polymerized onto the main polymer particles' surface, capable of becoming water soluble (or swellable) under certain conditions (pH, temperature and/or addition of swelling agents) and those conditions are applied after the SOL composition has been polymerized. Thus according to the present invention the SOL polymer composition is not water soluble/swellable unless the aforesaid conditions are applied.

In many cases, although it is easy to understand for anyone knowledgeable in the art, is not easy to see the transition from the insoluble to the solubilized state of the swellable/soluble outer layer (SOL) and also from the unswollen to the swollen state of the SOL. For the scope of the present application, a suitable SOL composition for the present invention, will be that polymer composition which, once polymerized in water as a single polymer without the core part of the present invention, at customary solids levels, with the help of surfactants, seeds or other adjuvants, produces a milky polymer dispersion that, under the aforesaid conditions, dramatically swells (the polymer undergoes an abrupt change in volume) or even dissolves in the water medium, typically becoming more transparent and producing a remarkable increase in viscosity.

The morphology of the resulting particle after the swellable/soluble outer layer (SOL) dissolution, resembles that of the well-known in the art colloidally-stabilized polymer particles. However, the star shaped polymers produced according to the present invention are very different.

Contrary to the customary way of producing colloidally-stabilized dispersion polymers in water, according to the present invention the colloid (the swollen/solubilized SOL after applying certain conditions) is created after the polymerization process has been completed, whereas in the prior art process for producing colloidally-stabilized dispersion polymers, the colloid, polyvinyl alcohol (PVOH), hydroxy ethyl cellulose (HEC), polyvinyl pyrrolidone (PVP), carboxy methyl cellulose (CMC), starch has to be present at the start and/or during the polymerization process.

Similarly, when we compare the process for producing the novel star shaped polymers according to the present invention with the also well-known ASR-supported polymerization, the ASR (alkali-soluble-resin) has to be produced prior to the main polymerization and be present at the start of that main polymerization process.

Common to these aforementioned processes, as it is well known in the art, the colloid has to be present preferably at the start in order to increase as much as possible the chances (the statistical probability) of a bonding interaction (grafting) between colloid and growing polymer, so the former can act as the stabilizing agent of the latter. This is the opposite in the process of the present invention.

Due to the fact that the grafting process in the conventional colloidal and ASR-supported classical processes is a probabilistic effect that depends on the type of colloid or ASR (alkali soluble resin) with regard to the polymer they intend to stabilize, as well as on the temperature, pH, amount of catalyst, chain-transfer-agent, etc., even under the most favorable conditions, the expected result is that a certain percentage of the colloid will be linked to the subsequently created polymer particle with the rest remaining dissolved in the water phase. In the process for producing the star shaped polymers of the present invention, the "colloid" (the swollen/solubilized SOL after applying certain conditions) remains covalently linked to the previously created polymer particle.

Other factors that are of primary importance for the classical grafting process above described (such as conventional colloid or ASR supported polymerization processes), like parameters of solubility, viscosity, polarity, ratio colloid/polymer or those parameters regarding the main polymerization reaction itself, such as type/amount of catalyst, reaction temperature, in-process viscosity, are a much lesser problem for the process according to the present invention since the "colloid" (the swollen/solubilized outer layer after applying certain conditions) only shows-up after the whole polymeric process has taken place and the swelling conditions have been applied.

The swellable/soluble outer layer (SOL) composition of the present invention, like the main polymeric parts, may contain all kind of functional monomers and may contain crosslinkable moieties or be pre-crosslinked without departing from the scope of the present invention. Also, like the main polymeric composition, it can be single or multistage. And those stages may differ compositionally too. The only requisite according to the present invention is that, whatever the composition of the SOL, given the appropriate conditions, it will undergo swelling/dissolving whereas the main polymeric particle as the core will not.

In a preferred embodiment, the condition to apply in order to make the swellable/soluble outer layer to swell or dissolve, is a change in the pH. This mechanism-works as well in an anionic environment as in a cationic one. Since most uses of water-dispersed polymers occur in anionic/non-ionic environments, embodiments of the present invention are directed to anionic/non-ionic environments.

In this preferred embodiment, a monomer blend is being polymerized into a system of discrete particles dispersed in water. At the end of that monomer feed, a new (second) monomer blend is polymerized (in order to form the swellable/soluble outer layer) whereby that new monomer blend contains a co-polymerizable acid monomer in sufficient amount versus the total of that second monomer feed content, that would make the polymer layer resulting from the polymerization of that second feed water-soluble/swellable, if sufficient amount of a base were added. The polymerization process is carried out within a pH range where the polymer of the secondary monomer blend is not significantly swellable/soluble. When the polymerization process is finished, a swelling agent (a base, like ammonia, amines, caustic soda, and the like) is added in sufficient amount as to raise the pH and bring the swellable/soluble outer layer (SOL) to the desired degree of swelling or dissolution.

Thus, according to the preferred embodiment of the present invention, it suffices that, provided the conditions (amount of base, temperature, solvents, agitation) to achieve the desired level of swelling/dissolving of the outer layer, the main polymeric parts as the core do not swell or dissolve in any significant way. Even if there is any slight swelling or dissolution of the core, this is negligible compared to the swellable/soluble outer layer.

Within this preferred embodiment of the present invention, in many potential applications, it will be particularly advantageous to choose as main polymeric composition for the core a monomer combination of relatively soft, low Tg polymer resulting in a room-temperature film-forming polymer, coupled with a high Tg, hard swellable/soluble outer layer (SOL) that has undergone swelling. In this particular case, room temperature soft film-forming polymers can display physical properties typical of harder, non-film-forming ones at room temperature.

Without wanting to be bound by theory, one would be lead to think that under water evaporation, the low Tg main polymer part will tend to film form through coalescence, as it happens with soft emulsion polymers, while the hard swellable/soluble outer layer (SOL) will not impede or hinder much that film-forming process, if previously swollen/dissolved, as it happens with swollen/dissolved hard resins which will tend to film form by themselves upon solvent evaporation. In these conditions, the disentangled polymeric chains will be free to film-form. And due to the different nature of the SOL, polymer chains of two very different segments will be forming the film: the longest part of that chain will be soft and potentially hydrophobic, with a polar, hard and more hydrophilic ending.

The following examples will illustrate some of the main aspects of the invention but by no means they constitute the entire scope, neither they imply any restriction to it.

COMPARATIVE EXAMPLE A-0

A 2-liter round-bottomed flask is equipped with paddle stirrer, thermometer, nitrogen inlet and reflux condenser. To 190 grams of deionized water 10 gr of a 20% solution of the ammonium salt of a phosphate ester surfactant (Rhodafac RS710@) are added and this solution is heated to 84° C. in the flask. There is added 40 grams of a buffered catalyst solution containing 5% sodium persulfate and 5% sodium carbonate. This is immediately followed by 30 grams of a monomer emulsion composed of 245 g of deionized water, 5.0 grams of a 15% SLS (sodium lauryl sulphate) solution, 10 grams of methacrylic acid (MAA), 200 g of methyl methacrylate (MMA) and 300 g of butyl acrylate (BA). Upon the addition of the 30 g, temperature rises to 82-84° C. and the remaining monomer emulsion is metered in at a rate of 5 grams/minutes. The reaction mixture is held at a temperature range of 80-82° C. 15-20 min before the monomer emulsion is finished, the temperature inside the reactor is let to increase steadily up to 88° C. Upon termination of the monomer emulsion addition, the reactor is kept at that temperature for about 20 minutes more and then cooled down to 70-75° C. There, a parallel addition of 10 g of a 5% strength t-BHP solution and 10 g of a similar strength solution of Bruggolite® SFF6 is performed at a simultaneous metering rate of 0.5 g/min. Upon termination of the redox reaction, the reactor is held at same temperature for 15 min more, followed by a neutralization step consisting on the addition of 26.5 g of a 6.7% strength sodium hydroxide solution at a approx. rate of 1 g/min. After cooling down, and with the addition of a few drops of biocide and a defoamer, the reactor content is discharged and filtered to remove any coagulum formed. The final latex product had a 48.4% solids content, a pH of 8.3, a Brookfield viscosity of 400 mPa·s and a particle size (PS) of 110 nm.

EXAMPLE A-1

The same procedure as in A-0 but where two monomer emulsions are prepared, a first monomer emulsion identical to the one in A-0 herein amounting to 90% of the total monomer emulsion, and a second monomer emulsion (the SOL monomer emulsion) made of 1 g SLS, 40 g MMA, 4 g BA and 6 g MAA, forming the remaining 10% of the total

10 monomers was added to the second monomer emulsion. The amount of the same NaOH solution used was 59 g. pH was 7.9 and PS was 150 nm.

EXAMPLE A-5

The same as A-4 only that the chain transfer agent used is MPA (3-Mercapto-propionic acid) instead of nDDM. The amount of the same NaOH solution used was 80 g. pH was 8.0 and PS was 199 nm.

It is obvious that the increased PS values compared with the comparative A-0 is due to the caustic-swollen swellable/ soluble outer layer (SOL).

Samples similar to these were overstabilized with excess SLS (sodium lauryl sulfate) to avoid coagulation upon pH changes. As it can be seen in the graph of FIG. 1 presented as drawing, measured particle size (PS) for the inventive polymer dispersions depends upon the pH.

And the impact in polymer physical properties is remarkable as shown in Table 1:

TABLE 1

| Comparison in polymer physical properties for Examples A | | | | | |
|---|---|---|---|---|---|
| Sample | | | | | |
| A-0 | A-1 | A-2 | A-3 | A-4 | A-5 |
| Particle size (nm) 110 (27) | 137 (46) | 150 (53) | 189 (74) | 150 (57) | 199 (66) |
| Tg (° C.) (TG54) 3 | 3 | 3 | 4 | 3 | 3.5 |
| MFFT (° C.) ~0 | ~0 | 0 | ~0 | ~0 | ~0 |
| Tensile-Elongation soft, elastic slgt tacky | flexible resilient non-tacky | flexible resilient non-tacky | flexible resilient non-tacky | flexible resilient non-tacky | flexible resilient non-tacky |
| % El at max stress ~768 | | too hard for proper measurement | | | |
| E-Modulus (MPa) 0.885 | | | | | |
| Max stress (MPa) 2.1 | | | | | | monomer emulsion wherein the carboxylic monomer is 12% on SOL monomers. The amount of the same NaOH solution used was 50 g. pH was 8.1 and PS was 137 nm.

EXAMPLE A-2

The same procedure as in A-0 but where two monomer emulsion are prepared, a first monomer emulsion identical to the one in A-0 herein amounting to 80% of the total monomer emulsion, and a second monomer emulsion (the SOL monomer emulsion) made of 2 g SLS, 80 g MMA, 8 g BA and 12 g MAA, forming the remaining 20% of the total monomer emulsion wherein the carboxylic monomer is 12% by weight on SOL monomers. The amount of the same NaOH solution used was 68.5 g. pH was 8.1 and PS was 150 nm.

EXAMPLE A-3

The same as A-1 only that the carboxylic functional monomer in the second monomer emulsion which is 12% by weight based on SOL monomers, is AA instead of MAA. The amount of the same NaOH solution used was 65 g. pH was 7.9 and PS was 189 nm.

EXAMPLE A-4

The same as A-2 only that 1.5% by weight of n-Dodecyl Mercaptan (nDDM) based on the total amount of SOL Surprisingly, and despite the hardness of the swellable/ soluble outer layer (SOL) with calculated Tg values of 80° C. or higher, the measured Tg values of the polymers according to the present invention are very similar to that of the conventional comparative example A-0.

Very interesting is also to observe that the MFFT remain largely unchanged, despite the fact that the polymers accordingly with the teaching look and feel much "harder" than the control. Whereas the control is a relatively soft and tacky and very elastic film of low E-modulus, the examples accordingly with the present invention are tougher, non-tacky, resilient and flexible but not so elastic.

COMPARATIVE EXAMPLE B-0

A 2-liter round-bottomed flask is equipped with paddle stirrer, thermometer, nitrogen inlet and reflux condenser. To 241 grams of deionized water 9 gr of a 15% solution of the sodium salt of an alkyl ethoxylated sulphate surfactant (Emulsogen EPA073@) are added and this solution is heated to 77-78° C. in the flask. There is added 5 grams of a catalyst solution containing 5% sodium persulfate. This is immediately followed by 29 grams of a monomer emulsion composed of 169 grams of deionized water, 34 g of the same surfactant, 5 grams of acrylic acid (AA), 100 g of methyl methacrylate (MMA), 100 g of ethyl acrylate (EA) and 300 g of butyl acrylate (BA). Upon the addition of the 29 g, temperature rises to 82-84° C. and the remaining monomer emulsion is metered in at a rate of 6 grams/minutes while 40 g of a buffered catalyst solution containing 3.75% sodium persulfate and 3.125% sodium carbonate is metered in at a 0.3 g/minute rate. The reaction mixture is held at a temperature range of 82-83° C. 15-20 min before the monomer emulsion is finished, the temperature inside the reactor is let to increase steadily up to 88° C. Upon termination of the monomer emulsion addition, the reactor is kept at that temperature for about 20 minutes more and then cooled down to 70-75° C. There, about 10 ppm of $FeSO_4$ complex with EDTA is shot in, followed by the parallel addition of 9 g of a 7% strength t-BHP solution and 9 g of a similar strength solution of Bruggolite® SFF6 is performed at a simultaneous metering rate of 0.5 g/min. Upon termination of the redox reaction, the reactor is held at same temperature for 15 min more, followed by a neutralization step consisting on the addition of 17.6 g of a 7.7% strength sodium hydroxide solution at a approx. rate of 1 g/min. After cooling down, and with the addition of a few drops of biocide and a defoamer, the reactor content is discharged and filtered to remove any coagulum formed. The final latex product had a 47.7% solids content, a pH of 8.6, a Brookfield viscosity of 40 mPa·s and a particle size of 149 nm.

Swellable/soluble outer layer (SOL) preparation for examples B-1, B-2, B-3 and B-4: A monomer emulsion of 66.66% monomer concentration in water is prepared with the following % composition by weight based on total SOL monomer:

SLS, MAA/MMA (1.43, 10/90)

Examples B-1, B-2, B-3 and B-4 are synthesized in the same way as comparative example B-0, just by substituting the last 8%, 12%, 16% and 20% respectively of the main monomer emulsion in B-0 by the SOL composition as reflected above. The examples of series B are explained in detail:

Examples B-1, B-2, B-3 and B-4 are synthesized in the same way as comparative example B-0, only that, as it was done in A series, two monomer emulsions are prepared:

B1

The first monomer emulsion identical to the one in B-0 herein amounting to 92% by weight of the total monomer emulsion in B-1 and a second monomer emulsion (the SOL monomer emulsion) with the above given composition forming the remaining 8% by weight of the total monomer emulsion.

B-2

The first monomer emulsion identical to the one in B-0 herein amounting to 88% by weight of the total monomer emulsion in B-2 and a second monomer emulsion (the SOL monomer emulsion) with the above given composition forming the remaining 12% by weight of the total monomer emulsion.

B-3

The first monomer emulsion identical to the one in B-0 herein amounting to 84% by weight of the total monomer emulsion in B-3 and a second monomer emulsion (the SOL monomer emulsion) with the above given composition forming the remaining 16% by weight of the total monomer emulsion.

B-4

The first monomer emulsion identical to the one in B-0 herein amounting to 80% by weight of the total monomer emulsion in B-4 and a second monomer emulsion (the SOL monomer emulsion) with the above given composition forming the remaining 20% by weight of the total monomer emulsion.

Apart from an increasing small amount of chain transfer agent (CTA) added to control SOL molecular weight, no other changes are induced. Temperatures, feed rates, catalyst amounts, and all other parameters are kept the same.

The 7.7% caustic solution is used as needed to equilibrate the final pH of the examples around 8.0-8.5.

The following Table 2 resumes the main characteristics of the thus obtained polymers:

TABLE 2

Comparison of resulting polymer characteristics for Examples B Again, as in the previous series, PS is increasing as the amount of swollen SOL increases.

|  | TRIAL NO | | | | |
|---|---|---|---|---|---|
|  | B-0 | B-1 | B-2 | B-3 | B-4 |
| Monomer ratio polymer vs SOL | Comparative 100/0 | 92/8 | 88/12 | 84/16 | 80/20 |
| Solid content (%) | 47.7 | 48.0 | 48.0 | 48.0 | 47.7 |
| pH | 8.6 | 8.3 | 8.0 | 7.9 | 8.0 |
| CTA % on SOL | 0 | 0 | 0.5 | 1.5 | 4.5 |
| Viscosity (cps) | 40 | 560 | 3100 | 2400 | 480 |
| Amount of NaOH 7.7% (g) | 17.6 | 29.5 | 36.8 | 46.2 | 68.5 |
| Particle size (nm) | 149(39) | 160(41) | 176(49) | 192(53) | 196(60) |
| Tg (° C.) (TG54) | −19.7 | −16.5 | −17.0 | −19.6 | −16.8 |
| MFFT (° C.) | ~0 | ~0 | ~0 | ~0 | ~0 |
| Tensile-Elongation | Very soft, elastic, tacky | Mod soft, elastic, tack-free | hard, elastic, tack-free | hard, elastic, tack-free | hard, resilient, tack-free |
| % El at max stress | 2893 | 1589 | 1490 | 740 |  |
| E-Modulus (MPa) | 0.225 | 0.95 | 5.19 | 11.65 |  |
| Max stress (MPa) | 0.9 | 1.7 | 2.3 | 2.6 |  |

And again, is surprising to see that despite the hardness of the swellable soluble outer layer (SOL) (Tg calculated over 110° C.) the measured Tg of the polymers accordingly with the present invention do not differ in any significant way from the conventional comparative example B0. However, the elastic properties of these trials are very different, with a remarkable increase in E-modulus as the ratio of the SOL increases, still showing very good elasticity and a dramatic reduction of tackiness.

The particle sizes are measured with the instrument Malvern Zetasizer Nano-S. The sample to be analysed is diluted in 10 mM NaCl aqueous (with demineralized water) solution. 1-2 drops of sample is added to 50 mL 10 mM NaCl solution. This mixture is placed into measuring PS sample cell by opening the cell area lid. cell is placed in to cell holder and thermal cap is placed on the cell. Cell area lid is closed and measurement is started. For each sample 3 measurements are done and an average result is reported.

The MFFTs (minimum film forming temperatures) are measured with the instrument RHOPOINT MFFT—90. After reaching appropriate temperature, device gives a warning and the ready button is pressed on the touch screen. The polymer to be measured should be drawn as a film in a U shape from cold to hot with a 75 micron applicator. The point where the polymer film is formed shows the minimum film forming temperature.

Star shaped polymer morphology according to the present invention is a new way, a new technique that enables the polymer formulator to achieve a different, more advanced balance of performance particularly when it comes to modify the viscoelastic properties of a polymer composition without sacrificing room temperature film formation and surface properties.

Various embodiments according to the present invention are explained below:

In a first embodiment the novel star shaped polymer, is a polymer dispersion of discrete particles dispersed in water, formed by a multistage radical emulsion polymerization process wherein the discrete particles comprise a core as the main polymeric part produced in a first stage and a swellable/soluble outer layer as the second polymeric part produced in a second stage wherein, at the end of the polymerization process, the main and the second polymeric parts differ from each other in swellability/solubility behavior under appropriate conditions of pH and/or temperature such that this difference may be used in order to trigger the swelling or dissolution of the second polymeric part without being detached from the core, while the core remains substantially unaffected.

The polymer dispersion of discrete particles dispersed in water is produced by a multistage radical emulsion polymerization process comprising the steps of:
polymerizing in a first stage a core of the discrete particles, as the main polymeric part comprising from 0 to 4.5% by weight of one or more monoethylenically unsaturated monomers containing an acidic functional group based on the total monomer composition of the main polymeric part,
and polymerizing in a second stage a swellable/soluble outer layer as the second polymeric part comprising at least 5% by weight of one or more monoethylenically unsaturated monomers containing an acidic functional group based on the total monomer composition of the swellable/soluble outer layer,
wherein the swellable/soluble outer polymeric layer is polymerized onto the surface of the main polymeric part whereby that outer layer undergoes swelling or dissolving when submitted to a pH change, while the main particle remains substantially unaffected.

According to a preferred embodiment the swellable/soluble outer layer of the particles in the polymer dispersion, comprises a polymer having a pH-sensitive polymer composition, in the sense that an increase in pH above 6 causes the swellable/soluble outer layer to swell or eventually, to dissolve.

In an embodiment, the amount of swellable/soluble outer layer represents between 3% to 50% by weight of the total polymer. In another embodiment, the amount of swellable/soluble outer layer represents between 5% to 30% by weight of the total polymer. In another one, the amount of swellable/soluble outer layer represents between 7.5% to 25% by weight of the total polymer.

In another embodiment of the present invention the swellable/soluble outer layer of the particles in the polymer dispersion, is a polymer comprising from 5% to 30% by weight of one or more mono- or poly-acid monomer, their anhydrides and their salts, based on the total monomer composition of the swellable/soluble outer layer. It is preferred the mono or poly—acid monomer to be mono- or di-carboxylic monomer, their anhydrides and their salts. It is also preferred that the amount of one or more mono or di-carboxylic monomer, their anhydrides and their salts, is 5% to 30% by weight based on the total monomer composition of the swellable/soluble outer layer.

It is mostly preferred that the mono- or di-carboxylic monomer of the swellable/soluble outer layer is selected from acrylic acid, methacrylic acid, itaconic acid or crotonic acid. In another embodiment the one or more monoethylenically unsaturated monomers containing an acidic functional group in the second stage is from 7.5% to 25% by weight based on the total monomer composition of the swellable/soluble outer layer polymerized in the second stage. In a different embodiment the one or more monoethylenically unsaturated monomers containing an acidic functional group is at least 10% by weight based on the total monomer composition of the swellable/soluble outer layer polymerized in the second stage.

In another embodiment the one or more non-acid-functional monomers completing the swellable/soluble outer layer composition, are selected from a list of monomers capable of copolymerizing with the one or more acid functional monomers. The one or more non-acid-functional monomers completing the swellable/soluble outer layer composition may be selected from, $C_1$ to $C_{16}$ (such as methyl, ethyl, propyl, butyl, 2-ethylhexyl, octyl) alcohol esters of acrylic and methacrylic acids; aromatic monomers preferably styrene and alpha-methyl-styrene; vinyl esters preferably vinyl acetate, vinyl propionate, vinyl chloride, veova-9 and 10; olefinic monomers preferably ethylene, propylene and butadiene, and combinations thereof.

In another embodiment up to 30% of the non-acid-functional monomers are one or more monomers of specific functionality capable of conferring or enhancing a specific property to the swellable/soluble outer layer, selected from nitrogen-containing monomers for increasing polarity and adhesion on some substrates preferably acrylonitrile, acrylamide or ureidoalkylmethacrylates; epoxy, hydroxy and carbonyl functional monomers for enhancing adhesion on other substrates and providing a certain degree of crosslinking preferably hydroxyethylmethacrylate (HEMA), glycidyl methacrylate (GlyMa), acetoacetoxyethyl methacrylate (AAEM); polyunsaturated monomers for producing intense crosslinking preferably allyl methacrylate (ALMA), butyl diglycol methacrylate (BDGMA), divnylbenzene (DVB);

dicarbonyl monomers preferably DiAAM; silane-functional and phosphate-functional monomers.

The resulting polymer dispersion may be used for adhesives, coatings or textile applications.

While the invention has been described with reference to preferred embodiments, it will be understood by those skilled in the art that various changes or modifications in form and detail may be made without departing from the scope and spirit of this invention.

The invention claimed is:

1. A multistage radical emulsion polymerization process for producing a polymer dispersion of discrete particles dispersed in water, said process comprising the steps of;

polymerizing in a first stage a core of the discrete particles, as the main polymeric part comprising from 0 to 4.5% by weight of one or more monoethylenically unsaturated monomers containing an acidic functional group based on the total monomer composition of the main polymeric part, polymerizing in a second stage a swellable/soluble outer layer as the second polymeric part comprising at least 5% by weight of one or more monoethylenically unsaturated monomers containing an acidic functional group based on the total monomer composition of the swellable/soluble outer layer, and non-acid-functional monomers completing the outer layer composition up to 100% by weight, the non-acid functional monomers being selected from monomer combinations capable of copolymerizing with a carboxylic functional monomer (s), wherein up to 30% by weight of the non-acid-functional monomers are monomers having a functionality that confers or enhances a specific property of the outer layer, said non-acid-functional monomers being selected from nitrogen-containing monomers, epoxy, hydroxy and carbonyl functional monomers, polyunsaturated monomers, dicarbonyl monomers, silanefunctional monomers, and phosphate-functional monomers, wherein the swellable/soluble outer polymeric layer is polymerized onto the surface of the main polymeric part, wherein the amount of swellable/soluble outer layer represents between 3% to 50% by weight of the total polymeric composition, and adding a swelling agent selected from a base in sufficient amount as to raise the pH and bring the swellable/soluble outer layer (SOL) to the desired degree of swelling or dissolution, whereby that outer layer undergoes swelling or dissolving when submitted to a pH change, while the main polymeric part remains substantially unaffected.

2. The process according to claim 1 wherein the swellable/soluble outer layer has a pH-sensitive polymer composition, in the sense that an increase in pH above 6 causes the swellable/soluble outer layer to swell or, eventually, to dissolve.

3. The process according to claim 1 wherein the amount of swellable/soluble outer layer represents between 5% to 30% by weight of the total polymeric composition.

4. The process according to claim 1 wherein the amount of swellable/soluble outer layer represents between 7.5% to 25% by weight of the total polymeric composition.

5. The process according to claim 1 wherein the swellable/soluble outer layer is a polymer containing from 5% to 30% by weight of one or more mono- or di-carboxylic monomer, their anhydrides and their salts, based on the total monomer composition of the swellable/soluble outer layer.

6. The process according to claim 5 wherein the carboxylic-functional monomer is selected from acrylic acid, methacrylic acid, itaconic acid or crotonic acid.

7. The process according to claim 1 wherein the non-acid-functional monomer(s) completing the composition of the swellable/soluble outer layer are selected from $C_1$ to $C_{16}$ monomers.

8. The process according to claim 1 wherein in the second stage, the one or more monoethylenically unsaturated monomers containing an acidic functional group is from 7.5% to 25% by weight based on the total monomer composition of the swellable/soluble outer layer polymerized in the second stage.

9. The process according to claim 1 wherein in the second stage, the one or more monoethylenically unsaturated monomers containing an acidic functional group is at least 10% by weight based on the total monomer composition of the swellable/soluble outer layer polymerized in the second stage.

10. A polymer dispersion of discrete particles dispersed in water obtained by the process according to claim 1.

11. A method of using the polymer dispersion of claim 1, as an adhesive, coating or textile treatment said method comprising applying the polymer dispersion to a substrate.

* * * * *